United States Patent [19]
Kurose

[11] Patent Number: 5,385,352
[45] Date of Patent: Jan. 31, 1995

[54] SEALING SYSTEM FOR BEARINGS, PARTICULARLY RADIAL-TYPE BEARINGS

[75] Inventor: Isao Kurose, Okayama, Japan

[73] Assignee: Uchiyama Manufacturing Corp., Okayama, Japan

[21] Appl. No.: 176,077

[22] Filed: Dec. 30, 1993

Related U.S. Application Data

[62] Division of Ser. No. 109,468, Aug. 20, 1993, Pat. No. 5,332,232.

[30] Foreign Application Priority Data

Nov. 7, 1990 [JP] Japan ................................. 2-117540

[51] Int. Cl.$^6$ ............................................. F16J 15/32
[52] U.S. Cl. ..................................... 277/37; 277/152; 384/147; 384/484
[58] Field of Search ..................... 271/9, 37, 50, 152, 271/159, 160, 189, 153; 384/903, 484, 486, 147

[56] References Cited

U.S. PATENT DOCUMENTS

| | | |
|---|---|---|
| 2,355,805 | 4/1943 | Koepp . |
| 2,887,330 | 1/1956 | Cobb . |
| 3,114,558 | 12/1965 | Rhoads et al. ........................ 277/37 |
| 3,114,559 | 2/1959 | Miglietti et al. . |
| 3,114,580 | 2/1959 | Dunn . |
| 3,226,168 | 1/1963 | Recknagel . |
| 3,338,584 | 9/1964 | Nakanishi et al. . |
| 3,630,530 | 12/1971 | Mackas . |
| 3,752,543 | 8/1973 | Schmidt . |
| 4,765,761 | 8/1988 | Umezski . |
| 4,805,919 | 2/1989 | Wiblyl et al. . |
| 4,892,040 | 9/1987 | Ebaugh et al. . |
| 4,928,371 | 5/1990 | Colanzi et al. . |

Primary Examiner—Daniel G. DePumpo
Attorney, Agent, or Firm—Wenderoth, Lind & Ponack

[57] ABSTRACT

A sealing system is provided with a construction which permits easy mounting in a bearing assembly, and which provides improved sealing functions by enhancing the ability to engage in a groove in the bearing assembly. The sealing system comprises a sealing device including a supplemental metal ring having a portion folded-over into a U-shape and a marginal end portion extending from the folded-over portion also folded-over into a funnel shape. When the sealing device is mounted in the bearing assembly, the marginal end portion may be expanded deformably to a greater diameter, to thereby allow it to engage in the groove and secure the sealing device in position in the bearing assembly.

6 Claims, 3 Drawing Sheets

SEALING SYSTEM FOR BEARINGS, PARTICULARLY RADIAL-TYPE BEARINGS

This is a divisional application of Ser. No. 08/109,468, filed Aug. 20, 1993, now U.S. Pat. No. 5,332,232.

BACKGROUND OF THE INVENTION

1. Field of the Invention

The present invention relates generally to a sealing system to be mounted on radial bearing-type ball and roller bearings, and more particularly to the construction of a sealing device designed to be fitted inside those bearings.

2. Description of the Prior Art

Conventionally, a ball bearing or roller bearing of the type referred to above usually includes an inner race and an outer race, either of which contains a sealing device that can be fitted and secured in position therein by making use of its elastic rubber property. For the conventional sealing system, when the turning torque that may occur during the lip sliding motion becomes greater than the slip torque that may occur in the area where the sealing device is fitted, the sealing device will rotate with the bearing shaft supported by the bearing. In order to prevent the sealing device from rotating with the bearing shaft in such situation, a greater interference must be provided for the rubber in the space between the sealing device and the inner or outer race where it is fitted. When the greater interference is provided, however, the sealing device may be mounted improperly within the inner or outer race, causing it to lose its ability to engage the race. Part of the rubber in the greater interference may also get out of the inner or outer race, and may suffer damage when the sealing device is fitted in. The result is a defective mounting.

As an alternative solution that addresses the above problem, a sealing plate that provides a different fitting construction has been proposed as disclosed in Japanese Utility Model Registration application as now published after examination under No. 47-19422. Its construction is shown in FIGS. 8(a) and 8(b). As seen from FIGS. 8(a) and (b), a sealing plate 5' is provided which includes an enlarged position 6' made of elastic material around the periphery thereof, and a metal core 7' acting as a supplemental part for the sealing plate 5' that includes a folded-over portion 8' around the marginal periphery thereof. When the sealing plate 5' is mounted, it may initially be mounted tentatively or temporarily into a groove 2' provided in the inner or outer race, as shown in FIG. 8(a). Then, the folded-over edge 8' of the metal core 7' may be forcedly expanded radially outwardly of the sealing plate 5'. This may permit the enlarged portion 6' to be fitted into the groove 2', thereby increasing the amount by which the sealing plate can engage the groove. Thus, the sealing plate may be secured in position. This process is shown in FIG. 8(b).

As may be understood from the above description, the construction disclosed in the publication referred to above, which is designed to permit the elastic enlarged portion 6' to engage the groove 2', cannot provide force sufficient to retain the sealing plate 5' securely within the groove 2', because the enlarged portion 6' provides a stronger elastic force. In addition, the elastic base material for the enlarged portion 6' may wear during its service life, and the sealing plate 5' may be loosened due to vibrations or any other external forces that may be applied, thereby causing it to lose its sealing function. If any attempt is made to expand the folded-over edge 8' further by force to increase the securing capability of the sealing plate, various types of deformations may occur. For example, the attempt to expand the folded-over edge 8' may increase its diameter which causes a deformation. This deformation may affect other component parts such as the metal core 7'. For this reason, the configuration balance of the sealing plate 5' may be decreased. Particularly, the portions of the sealing plate 5' which are located inwardly of the folded-over edge 8' of the metal core 7' may be significantly deformed. Therefore, the configuration precision for those portions may be decreased accordingly. Because of these problems, the construction as disclosed in the above publication cannot be applied as it is proposed therein.

If the metal core 7' does not provide adequate strength to resist forces which tend to significantly expand it, it may easily yield to any stress that may occur when it is being deformed unless a larger space is provided for the mounting shelf 9' on the side on which the rear part of the folded-over edge 8' aduts against it. In this case, the sealing plate 5' may be depressed toward the inner side of the bearing. Thus, the bearing must have constructional restrictions with particular regard to its configuration.

SUMMARY OF THE INVENTION

In light of the problems associated with the prior art construction as described above, it is a principal object of the present invention to provide a sealing system that is adapted to be fitted within a radial bearing-type ball or roller bearing, and provides increased strength to resist any stress that may occur when the sealing device engages a groove that is provided in the bearing race, preferably the outer race, for accepting the sealing device. According to the present invention, therefore, the sealing device cannot rotate with the bearing shaft.

In one preferred form of the sealing system according to the present invention, a sealing device, generally designated by 1, includes a resilient seal 3 and a metal ring 4 acting as a supplemental part for the sealing device. The sealing device 1 is adapted to be fitted into a groove 2 that is provided in the bearing race, preferably the outer race, to thereby seal the bearing from both inside and outside. As seen from FIG. 1, the supplemental metal rings 4 includes a portion 10 which is folded over in a U-shape and is enclosed within the seal 3. This part 10 is adapted to engage the groove 2. The ring 4 also includes a marginal end portion 11 extending from the folded-over portion 10 and which is folded over to provide a funnel shape. When the sealing device 1 is fitted into the groove 2, this may be accomplished as shown in FIG. 2. Firstly, the sealing device 1 is mounted in the groove 2 tentatively or temporarily. Then, a force is applied to the sealing device 1 in the axial direction of the supplemental metal ring 4 until the end of the marginal end portion 11 reaches the bottom of the groove 2. Finally, the sealing device 1 is secured in position within the groove 2 by any suitable means such as caulking.

In another preferred form shown in FIG. 5 and FIG. 6, the sealing device may include the marginal end portion 11 having cutouts 12 at predetermined intervals such as at regular intervals. In a further preferred form shown in FIG. 7, the sealing device may include a marginal end portion having a wavy form 13.

The sealing system and its construction according to the present invention provides several advantages and merits over the prior art constructions.

One of the advantages or merits can be obtained from the supplemental metal ring 4 that includes the portion 10 folded over in a U-shape, and the marginal end portion 11 which extends from the folded-over portion 10 and is further folded over into a funnel shape. According to this advantage, the sealing device 1 may initially be mounted in the groove 2 in the bearing as shown in FIG. 2(a), and then a force can be applied to the sealing device 1 from the outside of the bearing, as indicated by an arrow in FIG. 2(b), so that the supplemental metal ring 4 can be moved further into the groove 2. This will expand the marginal end portion 11 of the supplemental metal ring 4, with the seal 3 enclosing it, providing a greater diameter. With the end edge of the marginal end portion 11 being forced to the deepest portion of the groove 2, the supplemental metal ring 4 will engage the groove 2, and can thus be secured in position within the groove 2 (as shown in FIG. 2(b)).

When the margin end portion 11 of the supplemental metal ring 4 is expanded to a greater diameter, the marginal end portion 11 of the supplemental metal ring 4 is pressed against the groove 2 within the same, together with the seal 3 enclosing the marginal end portion 11. Thus, the sealing device 1 can provide improved sealing functions, and can provide increased strength when it engages the groove 2 so that it can resist any variations in the mechanical vibrations and pressure forces that may occur during operation. All stresses that may occur when the marginal end portion 11 of the supplemental metal ring 4 is expanded to the greater diameter can be absorbed by the U-shaped folded-over portion 10 so that they are not transmitted to the remaining parts of the supplemental metal ring 4 (i.e. to portions other than the U-shaped portion 10 itself. Thus, the supplemental metal ring 4 can retain its original configuration that has been designed into the shape of the sealing device. 1. In other words, the geometrical accuracy of the supplemental ring 4 can be maintained within specific tolerances, regardless of stresses that may occur when the marginal end portion 11 of the supplemental metal ring 4 is expanded to the greater diameter.

It may be appreciated from the foregoing description that the sealing device 1 may be mounted temporarily within the groove 2, and may finally be fitted in the secure position therein so that its supplemental metal ring 4 can engage the groove 2 by expanding its integral marginal end portion 11 to the greater diameter. Thus, the sealing device 1 can be seated securely and immovably within the groove 2 and retain its configuration as originally designed and manufactured.

It may also be appreciated that the sealing device 1 can be secured within the groove 2 in such a way that it resists to any turning torque caused by lip sliding motion. Therefore, the sealing device 1 will never rotate with the bearing shaft. As the sealing device according to the present invention is constructed such that it provides a particular shape which allows it to engage the groove when it is fitted therein, it provides the required sealing functions regardless of any variations in the vibrations and/or any variations in the internal or external pressure forces that may occur during operation. It also provides a broad range of tolerances with regard to any changes in the physical dimensions that may occur at varying operating or ambient temperatures. Thus, the sealing system according to the present invention provides the above-discussed advantages over the conventional prior art sealing systems and their constructions.

BRIEF DESCRIPTION OF THE DRAWINGS

These and other objects, advantages, and features of the present invention may be appreciated from the following detailed description of several preferred embodiments with reference to the accompanying drawings, in which:

FIGS. 8(a) and 8(b) are partial sectional views illustrating the construction of the prior art sealing system as it is mounted in the bearing, in which FIG. 8(a) illustrates how it is temporarily mounted, and FIG. 8(b) shows how it is finally secured in position.

DETAILS OF THE PREFERRED EMBODIMENT

The following describes several specific forms of the sealing system and its construction according to the present invention, by referring to the accompanying drawings. It should be understood that the present invention will not be limited to these forms, which may be modified in various ways within the scope and spirit of the invention as described below and as defined in the appended claims.

Figure 1:
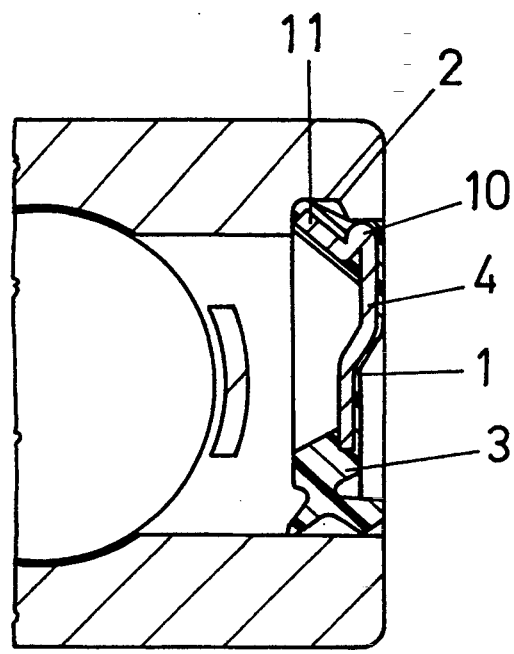
FIG. 1 is a sectional view showing a first preferred embodiment of the sealing system according to the present invention.
Figure 2A:
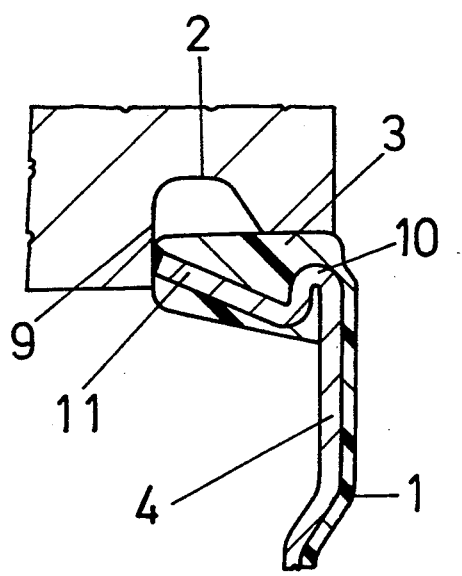
FIGS. 2(a) and 2(b) are partial sectional views of the sealing system shown in FIG. 1, with FIG. 2(a) illustrating how the sealing device is mounted temporarily, and FIG. 2(b) illustrating how the same sealing device is finally secured in position.
Figure 2B:
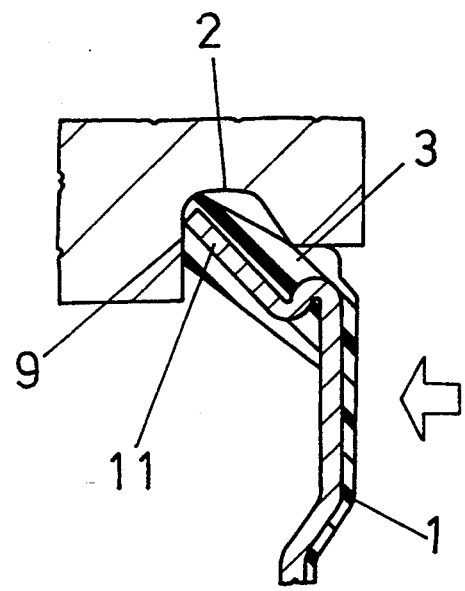

Referring now to FIG. 1 and FIGS. 2(a) and (b), a preferred embodiment of the present invention is described. As seen from those figures, the sealing device, generally designated by 1, includes a supplemental metal ring 4 which has a radially inner portion, a marginal outer end portion 11, and a U-shaped intermediate portion 10 with a curved base section and first and second leg sections extending in a direction away from the curved base section. The first leg section is integrally connected to an outer part of the radially inner portion and the marginal outer end portion 11 is integrally connected to the second leg section and extends away therefrom at an angle so as to define an elbow between the second leg section of the U-shaped portion and the marginal outer end portion. The end portion 11 that can be directed under the applied pressure force toward the interior of a bearing in which the sealing device is mounted. The marginal end portion 11 is adapted to be fitted in a groove 2 that is provided in the bearing race, preferably the outer race, and to make contact with the shelf 9 of the groove 2 under the applied pressure force. When the pressure force is applied, forcing the marginal end portion 11 to enter deep into the groove 2, the marginal end portion 11 may be expanded to a greater diameter. The marginal outer end portion defines an engaging and sealing means for automatically engaging the sealing device in the annular groove of the bearing assembly and forming a sealing relation with the bearing assembly when the sealing device is pressed into the bearing assembly. The U-shaped portion defines a means for allowing the marginal outer end portion to be expanded in diameter when the sealing device is pressed into the bearing assembly while preventing significant deformation of the radially inner portion.

Figure 3:
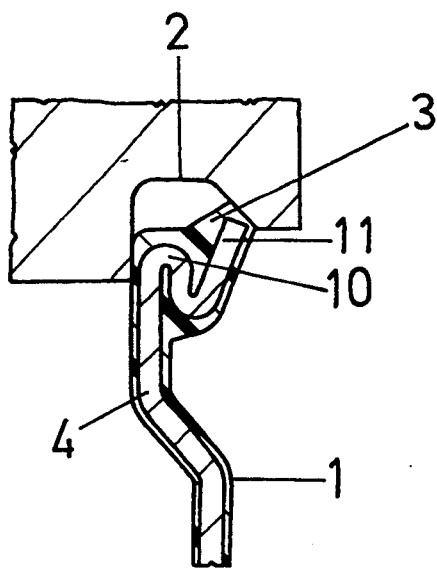
FIG. 3 is a partial sectional view showing a second preferred embodiment of the sealing system according to the present invention.
Figure 4:
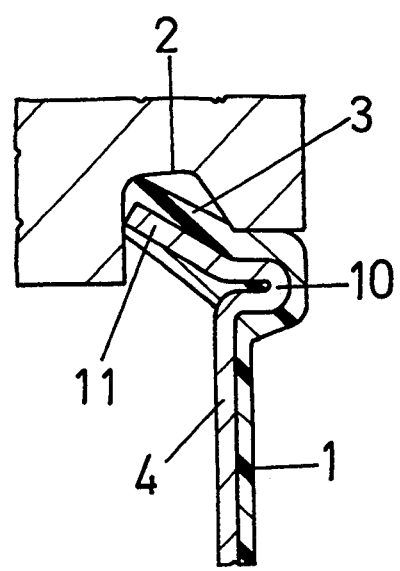
FIG. 4 is a partial sectional view showing a third preferred embodiment of the sealing system according to the present invention.

FIGS. 3 and 4 show other forms of the sealing system according to the present invention. Referring to FIG. 3, the supplemental metal ring 4 has a marginal end portion 11 that can be directed under the applied pressure force toward the exterior of a bearing in which the sealing device is mounted. In FIG. 4, the supplemental metal ring 4 includes a marginal end portion 11 that can be directed under the applied pressure force toward the interior of the bearing, and a folded-over U-shaped portion 10 whose projecting part can be directed toward the exterior of the bearing. In other words, in the FIG. 3 embodiment, the first and second legs of the U-shaped portion extend in a radially inward direction as shown, and in the FIG. 4 embodiment, the first and second legs extend in an axial direction (i.e. parallel to the axis) as shown. These various forms of the sealing construction as described and shown provide equivalent fitting abilities, and can be mounted by following the same steps. They can be selected and used, depending on the particular requirements.

Figure 5:
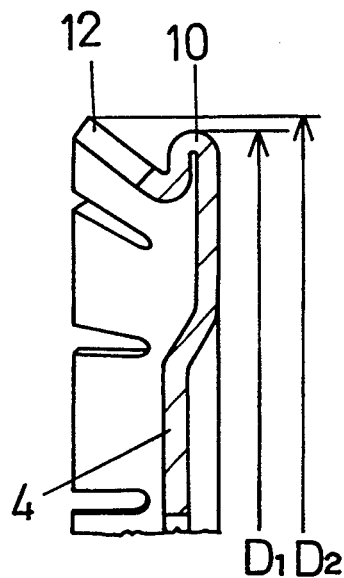
FIG. 5 is a partial sectional view showing one form of a supplemental metal ring according to the present invention.
Figure 6:
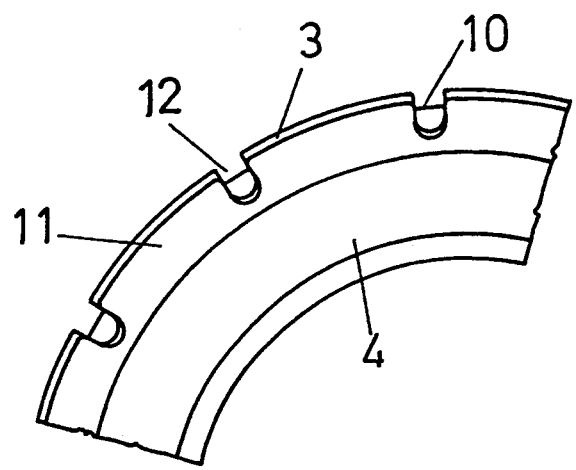
FIGS. 6 and 7 are partial plan views showing the variations of supplemental metal ring as viewed from inside the bearing in which it is mounted.
Figure 7:
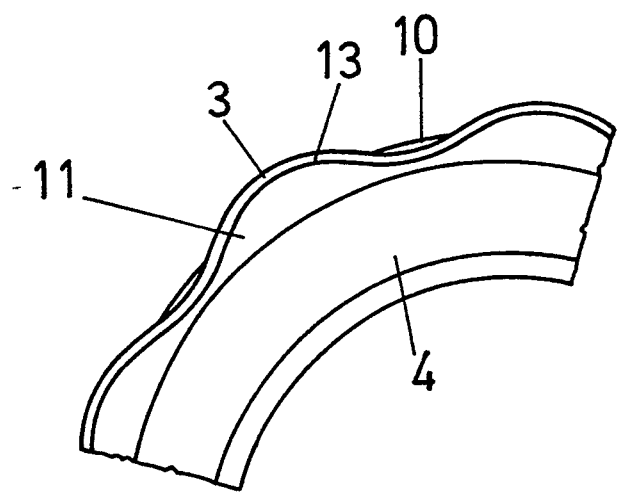
Figure 8A:
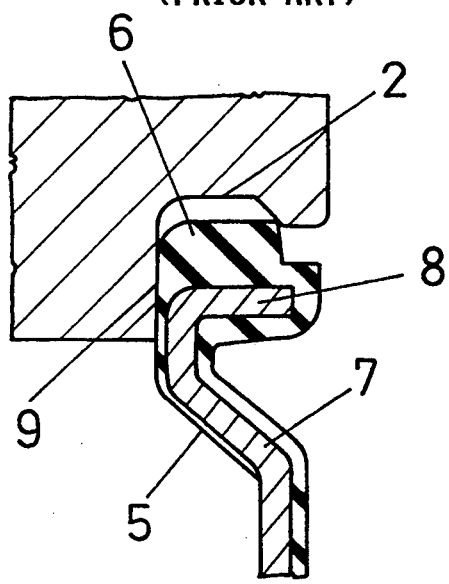
Figure 8B:
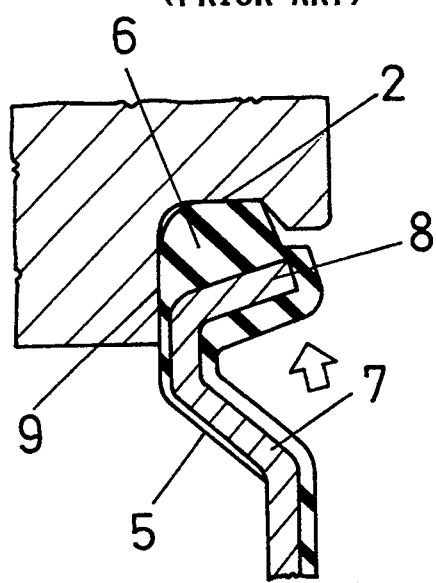

The marginal end portion 11 may include cutouts 12 at predetermined intervals about a peripheral edge thereon as shown in FIG. 5 and FIG. 6, or waves 13 as shown in FIG. 7. These cutouts or waves may be enclosed within a seal 3, which provides a great flexibility in forming the marginal end portion 11 into a funnel shape. This makes it easier to expand the marginal end portion to a greater diameter to thereby secure the sealing device in the groove.

As can be seen in FIGS. 1-4, the U-shaped portion 10 and the marginal outer end portion 11 are fully enclosed within the seal 3.

It may be desirable that the folded-over portion 10 and marginal end portion 11 of the supplemental metal ring 4 be such that the diameter $D_2$ of the marginal end portion 11 is greater than the diameter $D_1$ of the folded-over portion 10 as shown in FIG. 5. This facilitates the mounting operation. Functionally and effectively, both the portions may have substantially the same dimensional requirements.

Although the present invention has been described in full detail with reference to the several particularly preferred embodiments thereof, it should be understood that various changes and modifications may be made without departing from the scope and spirit of the invention.

What is claimed is:

1. A sealing device for use in sealing a bearing assembly having an inner race, an outer race and an annular groove formed in one of the inner and outer races, said sealing device comprising:

a metal ring;
   a resilient seal formed about said metal ring;
   wherein said metal ring includes a radially inner portion, a marginal outer end portion, and a U-shaped intermediate portion with a curved base section and first and second leg sections extending in a radially inward direction away from said curved base section, said first leg section being integrally connected to an outer part of said radially inner portion and said marginal outer end portion being integrally connected to said second leg section and extending away therefrom at an angle so as to define an elbow between said second leg section of said U-shaped portion and said marginal outer end portion;
   wherein said marginal outer end portion defines an engaging and sealing means for automatically engaging said sealing device in the annular groove of the bearing assembly and forming a sealing relation with the bearing assembly when said sealing device is pressed into the bearing assembly; and
   wherein said U-shaped portion defines a means for allowing said marginal outer end portion to be expanded in diameter when said sealing device is pressed into the bearing assembly while preventing significant deformation of said radially inner portion.

2. A sealing device as recited in claim 1, wherein cutouts are formed at predetermined intervals about a peripheral edge of said marginal outer end portion.

3. A sealing device as recited in claim 1, wherein a peripheral edge of said marginal outer end portion is formed in wave configuration.

4. A sealing device as recited in claim 1, wherein said U-shaped portion and said marginal outer end portion are fully enclosed within said resilient seal.

5. A sealing device as recited in claim 4, wherein cutouts are formed at predetermined intervals about a peripheral edge of said marginal outer end portion.

6. A sealing device as recited in claim 4, wherein a peripheral edge of said marginal outer end portion is formed in a wave configuration.

* * * * *